United States Patent
Nelson et al.

(10) Patent No.: US 9,110,761 B2
(45) Date of Patent: Aug. 18, 2015

(54) RESOURCE DATA STRUCTURES FOR FIRMWARE UPDATES

(75) Inventors: Eric F. Nelson, Woodinville, WA (US); James A. Schwartz, Jr., Seattle, WA (US); Sunil K. Muthuswamy, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 75 days.

(21) Appl. No.: 13/534,585

(22) Filed: Jun. 27, 2012

(65) Prior Publication Data
US 2014/0007067 A1 Jan. 2, 2014

(51) Int. Cl.
| | | |
|---|---|---|
| G06F 9/00 | (2006.01) |
| G06F 9/24 | (2006.01) |
| G06F 15/177 | (2006.01) |
| G06F 11/30 | (2006.01) |
| G06F 12/14 | (2006.01) |

(Continued)

(52) U.S. Cl.
CPC ...................................... *G06F 8/665* (2013.01)

(58) Field of Classification Search
CPC ............... G06F 8/30; G06F 8/41; G06F 8/60; G06F 8/61; G06F 8/64; G06F 8/65; G06F 8/67; G06F 8/68; G06F 8/665; G06F 9/44; G06F 9/4401; G06F 9/4411; G06F 9/44536; G06F 9/44589; G06F 11/1435; G06F 9/4406; G06F 9/4403
See application file for complete search history.

(56) References Cited

U.S. PATENT DOCUMENTS

| | | |
|---|---|---|
| 5,802,365 A | 9/1998 | Kathail et al. |
| 6,976,252 B2 | 12/2005 | White et al. |

(Continued)

FOREIGN PATENT DOCUMENTS

WO    WO 2009023296    2/2009

OTHER PUBLICATIONS

Petridou, Eleonora et al., "Automated Firmware Updating in Large Scale Heterogeneous Systems", *University of Amsterdam, System & Network Engineering*, retrieved from <https://www.os3.nl/_media/2010-2011/courses/lia/eleonora_jochem_report.pdf?id=2010-2011%3Acourses%3Alia%3Astart&cache=cache> on Apr. 13, 2012,(Mar. 28, 2011), 19 pages.

(Continued)

*Primary Examiner* — Don Wong
*Assistant Examiner* — Anibal Rivera
(74) *Attorney, Agent, or Firm* — Kate Drakos; Micky Minhas; Wolfe-SBMC (57) ABSTRACT

A firmware update system is described that collectively handles firmware updates for hardware resources of a computing device. The firmware update system may be configured to handle firmware updates in a consistent manner across different computing platforms/architectures. A data structure is defined to associate each updateable resource with a corresponding identifier to enumerate the updateable resources to the firmware update system. The firmware update system may reference the data structure to produce representations of the each individual resource that provide an operating system level abstraction through which detection, analysis, acquisition, deployment, installation, and tracking of firmware updates is managed. Using the representations, the firmware update system operates to discover available firmware updates collectively for the enumerated resources, match the updates to appropriate resources, and initiate installation of the updates.

20 Claims, 7 Drawing Sheets

(51) Int. Cl.
*G06F 9/44* (2006.01)
*G06F 3/00* (2006.01)
*G06F 9/46* (2006.01)
*G06F 11/00* (2006.01)
*G06F 12/16* (2006.01)
*G06F 9/445* (2006.01)

(56) References Cited

U.S. PATENT DOCUMENTS

| | | | |
|---|---|---|---|
| 6,978,453 | B2 | 12/2005 | Rao et al. |
| 7,036,007 | B2 | 4/2006 | Schelling et al. |
| 7,146,609 | B2 | 12/2006 | Thurston et al. |
| 7,152,157 | B2 | 12/2006 | Murphy et al. |
| 7,216,344 | B2 | 5/2007 | Cobb et al. |
| 7,376,870 | B2 | 5/2008 | Kataria et al. |
| 7,467,236 | B2 | 12/2008 | Saito et al. |
| 7,747,848 | B1 | 6/2010 | Nallagatla et al. |
| 8,010,959 | B2 | 8/2011 | Mullis, II et al. |
| 8,359,408 | B2 | 1/2013 | Ganga et al. |
| 8,495,618 | B1 | 7/2013 | Inbaraj et al. |
| 8,549,512 | B1* | 10/2013 | Vannatter et al. ........... 717/171 |
| 8,555,043 | B1 | 10/2013 | Nallagatla et al. |
| 8,972,973 | B2 | 3/2015 | Cavalaris et al. |
| 9,032,423 | B2 | 5/2015 | Knichel et al. |
| 2002/0087734 | A1 | 7/2002 | Marshall et al. |
| 2002/0092008 | A1 | 7/2002 | Kehne et al. |
| 2002/0188836 | A1* | 12/2002 | Gurumoorthy et al. ......... 713/1 |
| 2003/0041088 | A1 | 2/2003 | Wilson et al. |
| 2003/0154368 | A1* | 8/2003 | Stevens et al. ................. 713/1 |
| 2004/0003103 | A1 | 1/2004 | Witt et al. |
| 2004/0205779 | A1 | 10/2004 | Almeida et al. |
| 2004/0215754 | A1 | 10/2004 | Orleth et al. |
| 2004/0230963 | A1* | 11/2004 | Rothman et al. ............. 717/168 |
| 2004/0255286 | A1 | 12/2004 | Rothman et al. |
| 2005/0108700 | A1* | 5/2005 | Chen et al. .................. 717/168 |
| 2005/0240826 | A1 | 10/2005 | Dickenson et al. |
| 2006/0020937 | A1 | 1/2006 | Schaefer |
| 2006/0130073 | A1 | 6/2006 | Faist et al. |
| 2006/0143600 | A1 | 6/2006 | Cottrell et al. |
| 2006/0174240 | A1 | 8/2006 | Flynn |
| 2006/0217111 | A1 | 9/2006 | Marolia et al. |
| 2006/0224874 | A1 | 10/2006 | Lu et al. |
| 2007/0094673 | A1 | 4/2007 | Hunt et al. |
| 2007/0277241 | A1* | 11/2007 | Repasi et al. .................. 726/24 |
| 2008/0005733 | A1 | 1/2008 | Ramachandran et al. |
| 2008/0028385 | A1 | 1/2008 | Brown et al. |
| 2008/0046877 | A1 | 2/2008 | Ford |
| 2008/0126778 | A1 | 5/2008 | Bishop et al. |
| 2008/0127165 | A1 | 5/2008 | Mullis et al. |
| 2008/0250403 | A1* | 10/2008 | Moon et al. .................. 717/169 |
| 2009/0006832 | A1* | 1/2009 | Stevens et al. ................. 713/1 |
| 2009/0064196 | A1 | 3/2009 | Richardson et al. |
| 2009/0178033 | A1 | 7/2009 | Challener et al. |
| 2009/0287918 | A1* | 11/2009 | Goldstein et al. ............... 713/2 |
| 2009/0307680 | A1 | 12/2009 | Trufinescu |
| 2009/0328023 | A1 | 12/2009 | Bestland et al. |
| 2010/0131746 | A1* | 5/2010 | Cool et al. ...................... 713/2 |
| 2010/0218178 | A1 | 8/2010 | Sakai |
| 2010/0313191 | A1 | 12/2010 | Yin et al. |
| 2011/0072423 | A1 | 3/2011 | Fukata |
| 2011/0126043 | A1 | 5/2011 | Anderson et al. |
| 2011/0154313 | A1* | 6/2011 | Nolterieke et al. ........... 717/170 |
| 2011/0208975 | A1* | 8/2011 | Sibert .......................... 713/189 |
| 2011/0271268 | A1 | 11/2011 | Dang |
| 2012/0124567 | A1 | 5/2012 | Landry |
| 2012/0180076 | A1* | 7/2012 | Shutt et al. ................... 719/327 |
| 2013/0111459 | A1 | 5/2013 | Nakamoto |
| 2013/0179872 | A1 | 7/2013 | Kuzmack et al. |
| 2014/0007069 | A1 | 1/2014 | Cavalaris |
| 2014/0007073 | A1 | 1/2014 | Cavalaris |
| 2014/0130151 | A1* | 5/2014 | Krishnamurthy et al. ...... 726/22 |
| 2014/0259008 | A1 | 9/2014 | Bhattiprolu et al. |
| 2014/0380340 | A1 | 12/2014 | Knichel et al. |
| 2015/0169316 | A1 | 6/2015 | Cavalaris et al. |

OTHER PUBLICATIONS

Sinofsky, Steven "Building Windows for the ARM Processor Architecture", retrieved from <http://www.feishare.com/attachments/083_UEFIrequirements.pdf> on Apr. 12, 2012,(Feb. 9, 2012), 93 pages.

Sinofsky, Steven "Protecting the Pre-OS Environment with UEFI", retrieved from <http://blogs.msdn.com/b/b8/archive/2011/09/22/protecting-the-pre-os-environment-with-uefi.aspx> on Apr. 11, 2012,(Sep. 23, 2011), 42 pages.

"The Evolution of the Unified Extensible Firmware Interface", Retrieved at <<http://www.multicoreinfo.com/research/intel/uefie.pdf>>, Retrieved Date: Apr. 3, 2012, pp. 1-19.

"Intel® Itanium® Processor Family System Abstraction Layer Specification", Retrieved at <<http://www.intel.com/content/dam/www/public/us/en/documents/specification-updates/itanium-system-abstraction-layer-specification.pdf>>, Retrieved Date: Apr. 3, 2012, pp. 1-146.

"Oracle ILOM Platform Features for the Sun Fire X4170 M2 and X4270 M2 Servers", Retrieved at <<http://docs.oracle.com/cd/E19245-01/821-0489-13/ilom30_supplement.html>>, Retrieved Date: Apr. 3, 2012, pp. 1-57.

"UEFI Support and Requirements for Windows Operating Systems", Retrieved at <<http://www.feishare.com/attachments/083_UEFIrequirements.pdf>>, Apr. 24, 2009, pp. 1-7.

"International Search Report and Written Opinion", Application No. PCT/US2013/061091, Dec. 13, 2013, 11 pages.

"Non-Final Office Action", U.S. Appl. No. 13/534,678, Feb. 14, 2014, 15 pages.

"Non-Final Office Action", U.S. Appl. No. 13/534,632, Jan. 10, 2014, 21 pages.

"Final Office Action", U.S. Appl. No. 13/534,632, May 22, 2014, 21 pages.

"Final Office Action", U.S. Appl. No. 13/534,678, Jul. 17, 2014, 15 pages.

"Non-Final Office Action", U.S. Appl. No. 10/791,586, Aug. 8, 2006, 7 Pages.

"Non-Final Office Action", U.S. Appl. No. 13/923,461, Oct. 7, 2014, 10 pages.

"Notice of Allowance", U.S. Appl. No. 10/791,586, Jan. 29, 2007, 10 Pages.

"Notice of Allowance", U.S. Appl. No. 13/923,461, Dec. 5, 2014, 4 pages.

"Preparing for Driver Installation", Retrieved from <http://docs.oracle.com/cd/E19963-01/html/819-3196/loading-1.html> on Apr. 29, 2013, 2010, 1 page.

"Specifying Driver Load Order", Retrieved from <http://msdn.microsoft.com/en-us/library/windows/hardware/ff552319(v=vs.85).aspx> on Apr. 29, 2013, Sep. 29, 2011, 4 Pages.

Cavalaris, et al., "U.S. Application as Filed—Firmware Update Discovery and Distribution", U.S. Appl. No. 13/534,632, Jun. 27, 2012, 55 pages.

"Netdrive: A device Driver Implementation for Mass Storage Sharing on IBM PC Compatibles Over Local and Wide Area Networks", Local Area Networks, Proceedings of the IFIP TC6 International Conference on Local Area Network, Jan. 1990, 10 Pages.

"Non-Final Office Action", U.S. Appl. No. 13/534,678, Dec. 1, 2014, 15 pages.

"Notice of Allowance", U.S. Appl. No. 13/534,632, Oct. 24, 2014, 14 pages.

* cited by examiner

RESOURCE DATA STRUCTURES FOR FIRMWARE UPDATES

BACKGROUND

Different hardware resources (e.g., modules, components, and devices) of a computing system may have firmware for which updates are published from time to time. Traditionally, independent hardware vendors (IHVs) and original equipment manufacturers (OEMs) are responsible for handling firmware updates for their own hardware resources. Accordingly, different vendors and manufacturer not only individually handle creation and testing of firmware for their hardware, but may also establish different, independent and/or proprietary mechanisms and systems for deploying and applying updated firmware. Due in part to inconsistent handling of firmware updates, users may have difficulty understanding and managing firmware updates and keeping firmware update-to-date may be quite time consuming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A firmware update system is described. In one or more embodiments, the firmware update system is implemented to collectively handle firmware updates for a plurality of hardware resources in a defined and consistent manner. The firmware update system may be configured as an operating system component that handles firmware updates across different computing platforms and architectures. In one approach, a data structure is defined to associate each updateable resource with a corresponding identifier to enumerate the updateable resources to the firmware update system. The firmware update system may reference the data structure to produce representations of the each individual resource that may be employed to handle firmware updates. The representations provide an operating system level abstraction through which detection, analysis, acquisition, deployment, installation, and tracking of firmware updates is managed. Using the representations, the firmware update system operates to discover available firmware updates collectively for the enumerated resources, match the updates to appropriate resources, and initiate installation of the updates.

DETAILED DESCRIPTION

Overview

Traditionally, independent hardware vendors (IHVs) and original equipment manufacturers (OEMs) are responsible for handling firmware updates for their own hardware resources, which may make keeping firmware up-to-date complex and time consuming.

A firmware update system is described that collectively handles firmware updates for hardware resources of a computing device. The firmware update system may be configured to handle firmware updates in a consistent manner across different computing platforms/architectures. A data structure is defined to associate each updateable resource with a corresponding identifier to enumerate the updateable resources to the firmware update system. The firmware update system may reference the data structure to produce representations of the each individual resource that provide an operating system level abstraction through which detection, analysis, acquisition, deployment, installation, and tracking of firmware updates is managed. Using the representations, the firmware update system operates to discover available firmware updates collectively for the enumerated resources, match the updates to appropriate resources, and initiate installation of the updates.

In the discussion that follows, a section titled "Operating Environment" is provided and describes one environment in which one or more embodiments can be employed. Following this, a section titled "Firmware Update System Examples" describes example techniques and details in accordance with one or more embodiments. Last, a section titled "Example System" describes example computing systems and devices that can be utilized to implement one or more embodiments.

Operating Environment

Figure 1:
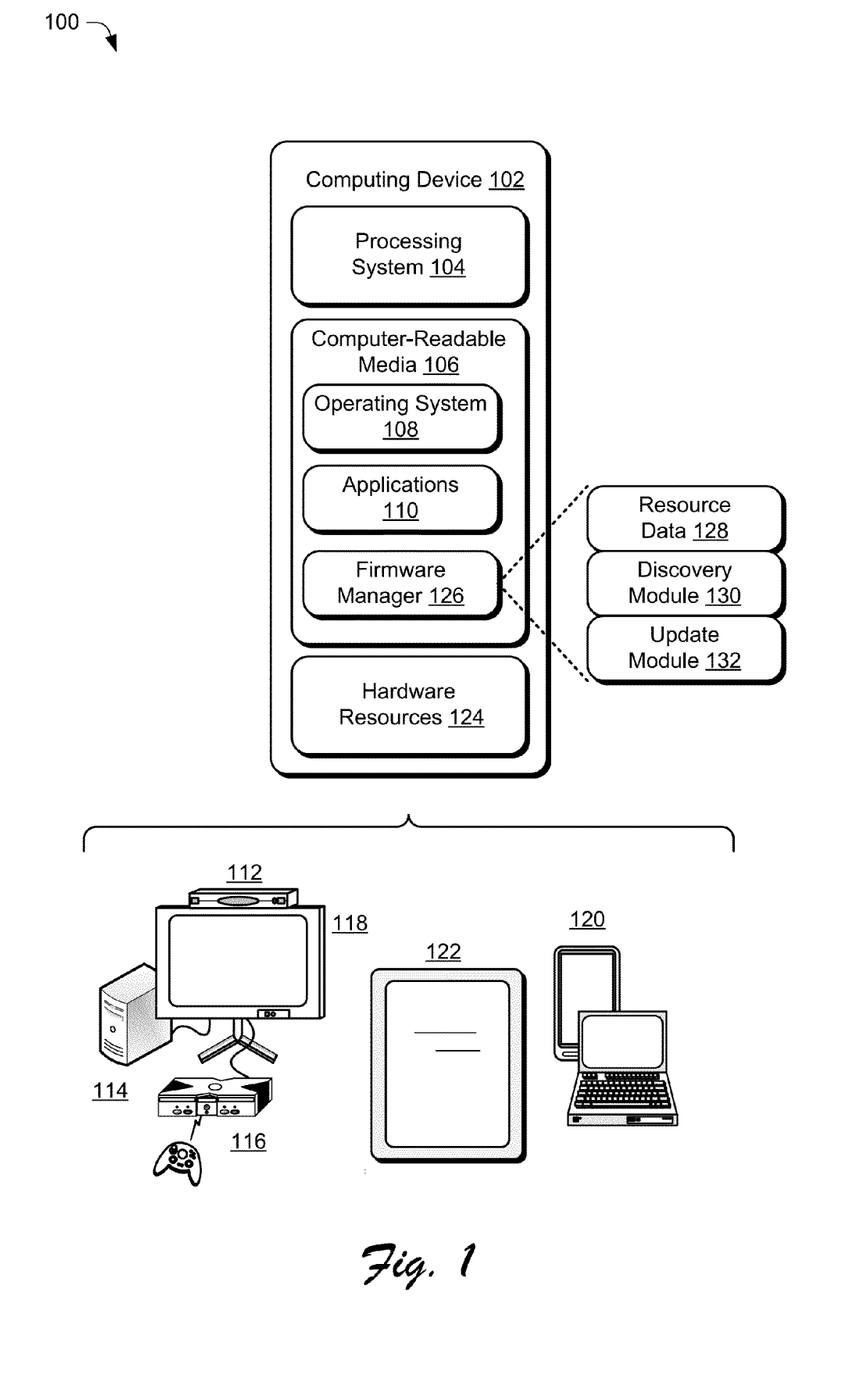
FIG. 1 illustrates an example operating environment in which one or more embodiments of a firmware update system can be employed.

FIG. 1 illustrates an operating environment in accordance with one or more embodiments, generally at 100. The environment 100 includes a computing device 102 having a processing system 104, one or more computer-readable media 106, an operating system 108, and one or more applications 110 that reside on the computer-readable media and which are executable by the processor(s). The processing system 104 may be configured in various way to retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, portable device 120, tablet or slate device 122, and may that include an integrated display. Any of the computing devices can be implemented with various components, such as one or more processors and memory devices, as well as with any combination of differing components. One example of a computing system that can represent various systems and/or devices including the computing device 102 is shown and described below in FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

The computing device 102 also includes a variety of different hardware resources 124 that represent different components and devices typically associated with the computing devices. The hardware resources 124 may include integrated components, removable components, and external peripheral devices connectable to the computing device 102 via wired and/or wireless connections. At least some of the hardware resources 124 include firmware that may be updated in accordance with the techniques described above and below.

Figure 2:
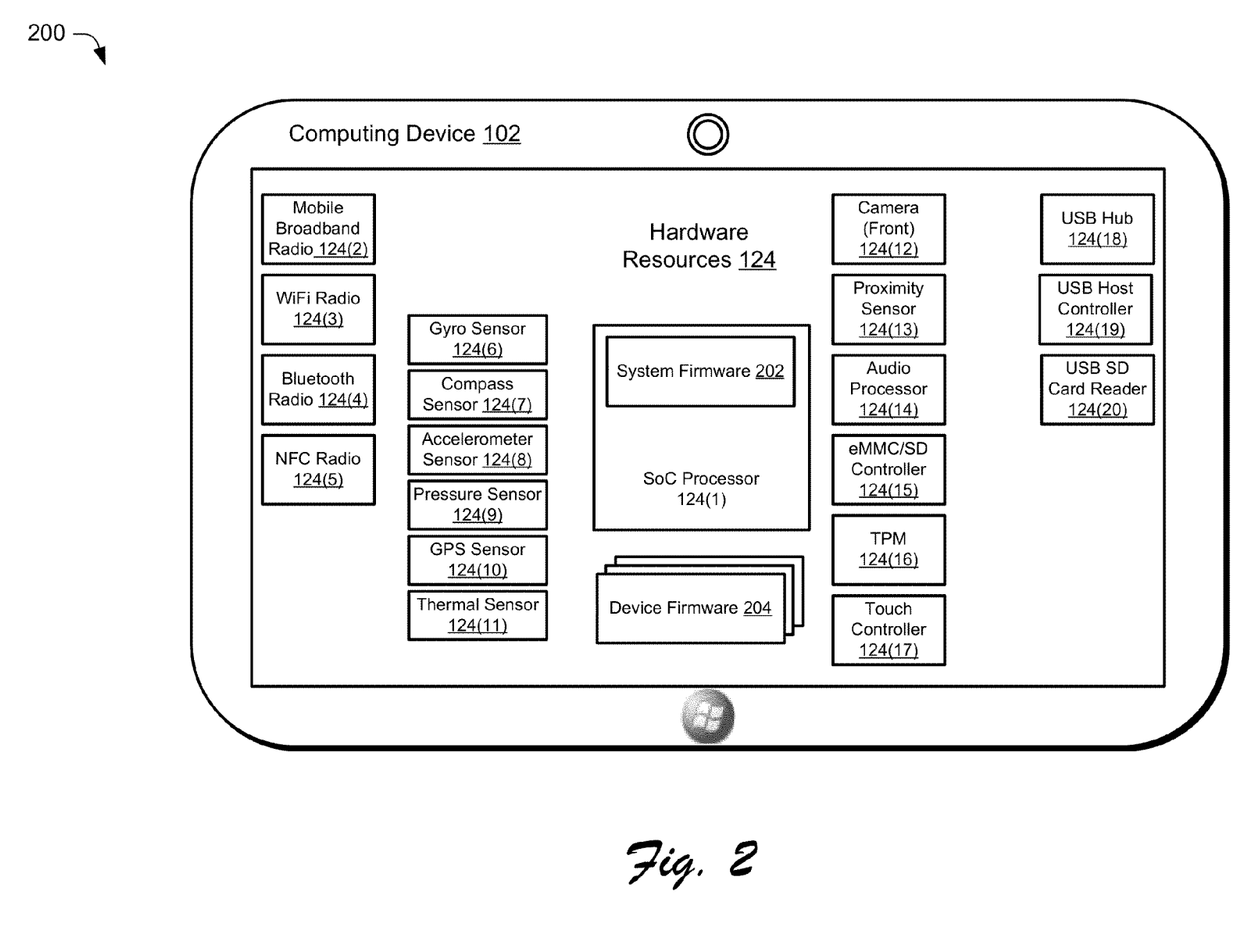
FIG. 2 is a diagram showing example resources of a device in accordance with one or more embodiments.

A variety of different hardware resources 124 are contemplated. By way of example and not limitation, FIG. 2 depicts generally at 200 some representative hardware resources 124 in relation to an example computing device 102. The computing device 102 shown in FIG. 2 includes system firmware 202 that may be associated with the particular processing system, architecture, and/or platform for the device, which in this example is depicted as being a system on chip (SoC) processor 124(1). Various other example hardware resources shown in FIG. 2 that may have corresponding device firmware 204 that is updateable include different radios, sensors, controllers, components, and devices labeled as hardware resources 124(2) to 124(20). Each resource may have its own associated device firmware 204. Updates to device firmware 204 may be matched to resources and applied on an individual basis. Additionally or alternatively, device firmware 204 for some resources may be updated as part of an update to system firmware 202 in a combined manner, further details of which are discussed below.

The computing device 102 of FIG. 1 also includes a firmware manager 126 that resides on the computer-readable media and which is executable by the processor(s). The firmware manager 126 represents functionality to implement a firmware update system and perform various techniques to collectively manage firmware updates for a plurality of hardware resources 124 as described above and below. Although a single firmware manager is depicted, multiple firmware managers each configured to manage updates for one or more hardware components may also be employed. The firmware manager 126 may be implemented as a standalone component as depicted in FIG. 1. The firmware manager 126 may also be implemented as an integrated component of the operating system 108.

Management of firmware updates by the firmware manager 126 may include, but is not limited to, discovery of resources and detection, analysis, acquisition, distribution, installation, and tracking of firmware updates for particular resources that are registered or otherwise designated to obtain firmware updates through the firmware update system. For example, the firmware manager 126 may include or otherwise make use of resource data 128 that enables the firmware manager 126 to enumerate resources for which handling of firmware updates through the system is designated. As described in greater detail below, resource data 128 may be in the form of a table or other suitable data structure that is populated with entries corresponding to each updateable resource.

By way of example and not limitation, functionality of the firmware manager 126 may be logically divided into various sub-modules, such as the example discovery module 130 and update module 132 illustrated in FIG. 1. Generally speaking, the discovery module 130 represents functionality to use the resource data 128 to identify resources that are designated for firmware handling by the system and detect available updates. The discovery module 130 may also perform analysis to match available updates to appropriate resources. The update module 132 represents functionality to apply the updates, which may include acquiring the updates in a suitable form and deploying the updates to appropriate resources to initiate installation. The update module 132 may also perform tracking of the updates to identify success or failure, record version information for installed firmware, enable rollbacks of firmware, and so forth. Some functionality described herein in relation to the firmware manager 126 may also be implemented by a boot loader for the operating system 108 and/or by the operating system itself.

In this manner, responsibility for handling of firmware updates may be offloaded to the firmware manager 126, which is configured to collectively manage firmware updates on behalf of different hardware resources 124 and/or corresponding IHVs and OEMs. These and other aspects are described in greater detail in relation to the following figures.

Having described an example operating environment, consider now example details regarding a firmware update system in accordance with one or more embodiments.

Firmware Update System Examples

In the following section, implementation details and example techniques for a firmware update system configured to collectively manage firmware updates are discussed. The discussion includes some example procedure(s) that can be implemented in connection with any suitable hardware, software, firmware, or combination thereof. In at least some embodiments, the procedures may be implemented by way of a suitability configured computing device, such as the example computing device 102 of FIG. 1 that includes or otherwise makes use of a firmware manager 126, system firmware 202, and device firmware 204. Details regarding aspects of a suitable firmware update system are discussed in turn below in different sub-sections titled "Resource Data Structures," "Discovery and Distribution" and "Heterogeneous Firmware Updates," respectively.

Resource Data Structures

As noted previously, the firmware update system may rely upon resource data 128 that is generally configured to describe hardware resources for a platform that are to be updated via a firmware update system provided by the operating system, as a standalone component, or otherwise. The resource data 128 can be configured in various ways to enable manufacturers and vendors to opt into firmware update functionality that is implemented by the system.

Resource data 128 may be configured in any suitable way to facilitate firmware updates. Broadly speaking, the resource data 128 is configured to identify resources associated with a platform to the firmware manager/operating system and convey metadata that describes how to locate resources and corresponding firmware updates. The metadata may also indicate how to interact with the resources to initiate firmware updates. Further, the metadata may encompass status information regarding success, failure, and progress of firmware updates and/or version information that indicates the current versions of firmware. Status and version information may be modified as part of the firmware update process to reflect current data for the resource. The resource data 128 may also reflect resource identifiers that may be used to reference the resources and distinguish between resources throughout the system.

The resource data 128 may be configured using designated formats and conventions that the firmware manager recognizes and is configured to process to identify and register resources for firmware update handling. Thus, to take advantage of the firmware update capabilities provided by the operating system, an IHV/OEM associated with a platform may identify/advertise selected resources for collective firmware handling through the system by populating resource data 128 in an appropriate format to describe platform resources. The system may use the resource data 128 to create abstract representations of the resources used to manage firmware updates. In this manner, handling of the firmware updates for the selected resources of the platform can effectively be offloaded to the firmware manager/operating system.

Figure 3:
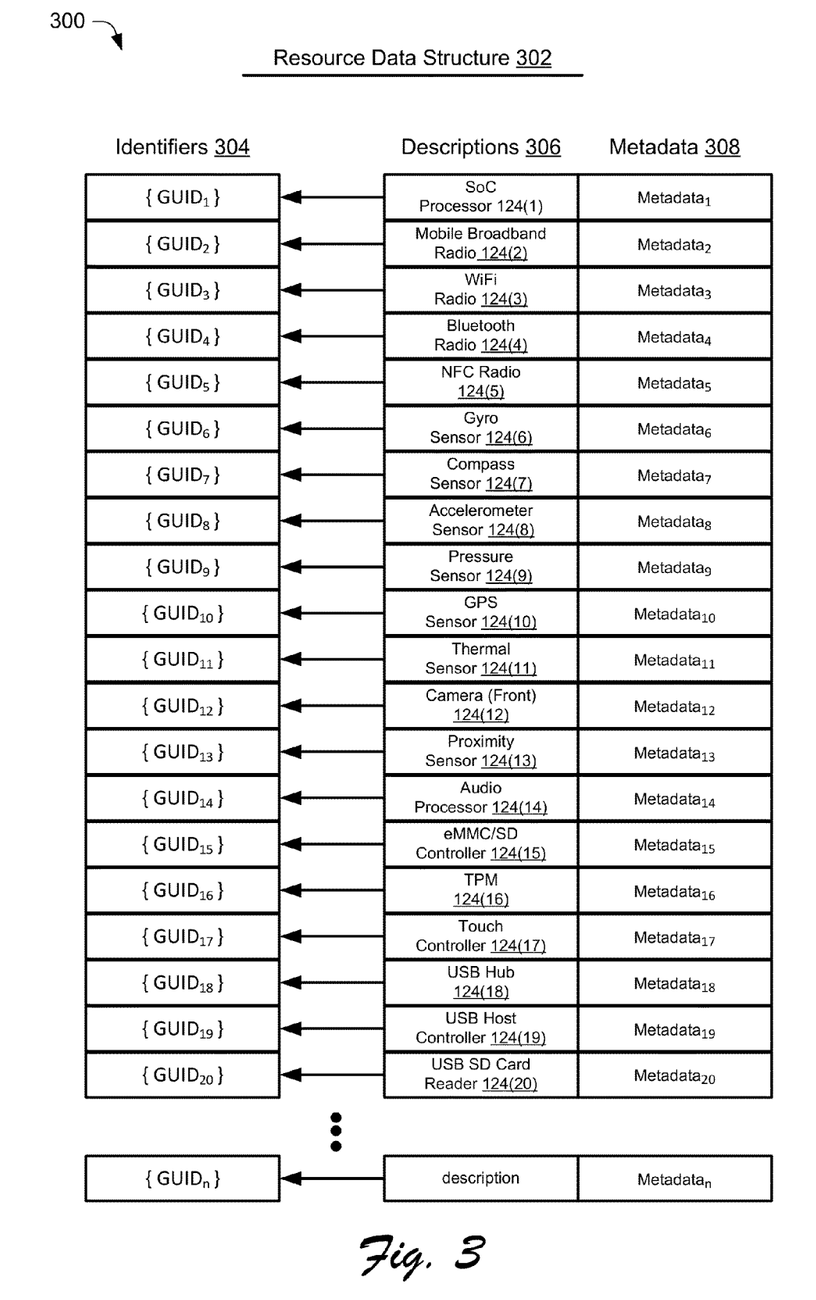
FIG. 3 is a diagram showing an example resource data structure to convey information regarding resources to firmware update system in accordance with one or more embodiments.

By way of example, FIG. 3 depicts generally at 300 an example resource data structure 302, which corresponds to the various hardware resources 124 represented in FIG. 2. The resource data structure 302 may represent one or more data files, database records, tables, table entries, objects, definitions, and/or other suitable structures that can be used to encode resource data 128 for a platform. Here, identifiers 304 may be assigned to each individual resource and the resource data structure 302 may be employed to convey data regarding and/or offload firmware handling for any number "n" of resources associated with the platform. In the depicted example, the identifiers are represented as respective globally unique identifiers (GUID) assigned to resources, although any kind of identifiers suitable to reference and distinguish between the resources of a platform may be employed. In addition to the identifiers 304, resource data encoded by a resource data structure 302 is depicted as including corresponding descriptions 306 and metadata 308 that contain various details regarding the resources for use by the system to set-up and implement firmware management for the resources.

As mentioned previously, resource data structure 302 may be configured in various ways. By way of example and not limitation, in some embodiments, the resource data structure 302 may be configured as a table for a Unified Extensible Firmware Interface (UEFI) system. The UEFI is a standard that defines parameters of an interface between an operating system and system firmware for a platform. The UEFI provide standard conventions for describing aspects of a platform to the OS through functions, methods, tables, and so forth. Specifically, the UEFI provides infrastructure, conventions, and techniques for data exchange and interaction between system boot code and a boot loader of the OS during booting as well as at runtime. In at least some embodiments, the infrastructure defined per UEFI may be leveraged to create a suitable resource data structure 302 for implementation of a firmware update system. Nonetheless, it should be appreciated that a variety of other kinds of techniques, systems, tables, and/or structures may also be employed to supply resource data 128 for a platform to the firmware update system in a comparable manner. Using the existing infrastructure of UEFI, though, may avoid some complexity and duplicative functions/effort that may be involved with developing a standalone system and/or conventions for implementing the resource data structure 302 described herein.

As mentioned, the resource data structure 302 may be implemented as a table, such as a UEFI table, that includes entries for different resources. The entries in the table may include at least identifiers 304, descriptions 306, and metadata 308 as discussed above. The entries in the table identify and describe hardware resources that have updateable firmware. This may include resource types and categorization data; instructions/details regarding how to interact with the resources and update the resources; links, locations, and/or addresses that may be used to register for, download, or otherwise obtain updates; and so forth. Moreover, metadata 308 for the entries may record status/version information corresponding to the described resources. A variety of different fields may be defined for entries in the table to capture information that is sufficient to enable the firmware manager 126 to set-up and carry out updates.

As but one illustrative example of the foregoing concepts, consider the following example tables, which represent some example field definitions and entries, respectively. Information represented by the example tables may be implemented as a UEFI table or another suitable data structure as described previously.

TABLE 1

Firmware Update Table Definition

| Field | Byte Length | Byte Offset | Description |
|---|---|---|---|
| Firmware Resource Count | 4 | 0 | The number of firmware resources selected for updates by the table |
| Firmware Resource Maximum | 4 | 4 | The number of resource array entries that can be added without reallocating the table, must not be zero. |
| Firmware Resource Version | 8 | 8 | The firmware resource entry version. |
| Firmware Resource Entry Array | | | Firmware Resource Entry 0 |
| Firmware Class | 16 | 16 | Defines the class of systems for which an update gets applied. |
| Firmware Type | 4 | 32 | Identifies the type of firmware resource for the entry. |
| Firmware Version | 4 | 36 | The current firmware version, where a larger number represents a newer release. |
| Lowest Supported Firmware Version | 4 | 40 | The lowest firmware version that can be rolled back to, i.e. the last firmware version that contained a security fix. Rollbacks to prior version may be prevented for security |
| Update Package Flags | 4 | 44 | This field is used to conveys information regarding packages passed into a resource during the updating of firmware a resource |
| Last Attempt Version | 4 | 48 | Version of the last firmware update attempt. |
| Last Attempt Status | 4 | 52 | Status of the last firmware update attempt. |

Table 1 shows and provides descriptions of various example fields that may be populated with resource data 128. In addition to the descriptions contained in the table, consider the following additional points regarding the example fields. The firmware class field may contain the previously described identifier 304 that identifies a firmware component that can be updated via system. The system may use the identifier to target updates to appropriate resources as described in detail later in this document.

The firmware type field describes the firmware resource type. The following table provides one example of different firmware types and values that be defined for resources via the firmware type field.

TABLE 2

Firmware Type Field Values

| Value | Definition |
|---|---|
| 0 | Unknown |
| 1 | System firmware |
| 2 | Device firmware |
| 3 | Firmware driver |

The update package flags are generally used to convey information regarding packages passed into a resource during the updating of firmware a resource. The values and structure for this field depends upon the particular mechanism used to deliver the update packages. The update package flags are configured to represent and/or convey instructions regarding how to handle packages for the firmware updates. For instance, in a UEFI implementation the field may contains capsule flags regarding update capsules that are passed into the run-time service that consumes the updates.

The last attempt version field describes the last firmware version for which an update was attempted and the last attempt status provides an indication regarding the success or failure of the last update attempt. A variety of values or codes may be used to represent different possible outcomes of an update. The following table provides one example of different status types and values that may be defined for firmware updates via the last attempt status field.

TABLE 3

Last Attempt Status Field Values

| Value | Definition |
|---|---|
| 0 | Success |
| 1 | Error: Unsuccessful |
| 2 | Error: Insufficient Resources |
| 3 | Error: Incorrect Version |
| 4 | Error: Invalid Image Format |
| 5 | Error: Authentication Error |
| 6 | Error: Power Event, AC Not Connected |
| 7 | Error: Power Event, Insufficient Battery |

In accordance with the foregoing description of some example fields and metadata, Table 4 below provides an example resource data table with example entries for two resources. In general, techniques for collective firmware updates described herein apply to both system firmware associated with core hardware of the platform and device firmware that may be updated independently of system firmware. One or more individual components may be updated in a collective manner as part of an update to system firmware. Accordingly, the table (or other data structure) is configured to contain one entry for system firmware that may encompass multiple individual devices/resources. In addition, the table contains one entry for each additional device that is designated to employ the firmware update system for handling of firmware updates. In this context, Table 4 illustrates both a system firmware entry and one example device entry. Additional entries comparable to the example device entry may be included to support any number of updatable devices.

TABLE 4

Firmware Update Table Example.

| Field | Value | Comment |
|---|---|---|
| Firmware Resource Count | 2 | This table contains two firmware resource entries. |
| Firmware Resource Maximum | 2 | This table allocation contains enough space to describe a maximum of two resources. |
| Firmware Resource Version | 1 | The firmware resource entry format version this table uses is one. |
| Firmware Resource Entry Array | Firmware Resource Entry 0 | |
| Firmware Class | {SYSTEM_FIRMWARE} | This value identifies the system firmware for updates |
| Firmware Type | 1 | System firmware type is one. |
| Firmware Version | 1 | The current system firmware version is one. |
| Lowest Supported Firmware Version | 1 | The lowest supported firmware version is 1, so firmware is prevented from being rolled-back to a version earlier than version 1. |
| Update Package Flags | 0 | System firmware doesn't define any custom update flags. |
| Last Attempt Version | 1 | The last system firmware version for which an update was attempted was one. |
| Last Attempt Status | 0 | The last system firmware update attempt was successful. |
| | Firmware Resource Entry 1 | |
| Firmware Class | {DEVICE_FIRMWARE} | This value the device firmware for update. |
| Firmware Type | 2 | Device firmware type is two. |
| Firmware Version | 1 | The current device firmware version is one. |
| Lowest Supported Firmware Version | 1 | The lowest supported firmware version is 1, so firmware is prevented from being rolled-back to a version earlier than version 1. |
| Update Package Flags | 0x8010 | Device firmware defines private update flags (0x8010). |
| Last Attempt Version | 1 | The last device firmware version for which an update was attempted is one. |
| Last Attempt Status | 0 | The last device firmware update attempt was successful. |

It is once again noted that the above described table and/or UEFI implementations are provided as illustrative examples of resource data structures suitable for use by a firmware update system. In practice, a variety of different formats and techniques for conveying resource data 128 to the firmware manager 126 may be employed. For example, a table or other data structure comparable to the foregoing examples may be configured for other kinds of interfaces between an OS and system boot code including, but not limited to, Advanced Configuration and Power Interface (ACPI), custom application programming interfaces (APIs), and Basic Input Output System (BIOS) interfaces.

In another approach, the firmware manager 126 may be configured to implement an interrogation scheme to request and obtain resource data at various times. In this case, the firmware manager 126 may invoke a method or make a function call to query system code for information regarding the resources. This may occur during a boot sequence and periodically and/or on-demand thereafter. This interrogation technique may be used in addition to or in lieu of populating a table through which the OS may discover and enumerate resources for a platform.

Figure 4:
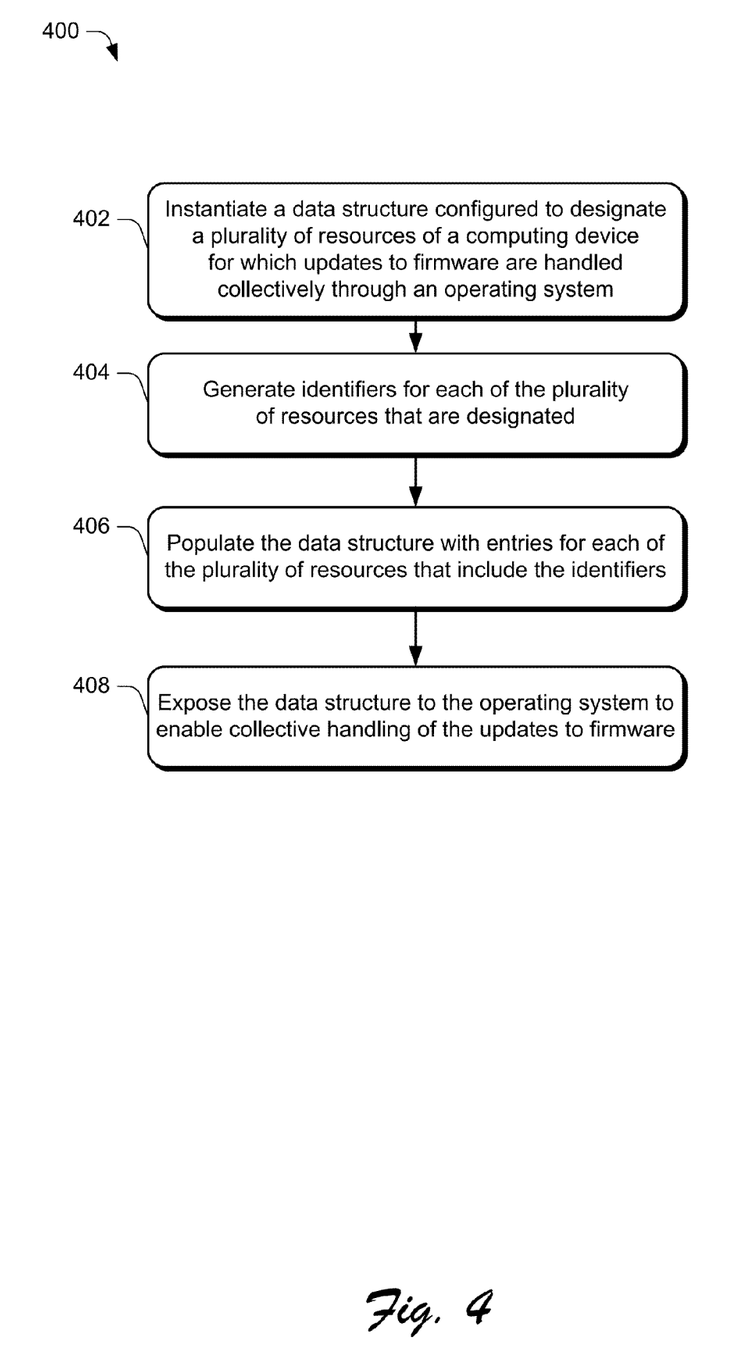
FIG. 4 is a flow diagram that describes details of an example procedure in accordance with one or more embodiments.

FIG. 4 depicts an example procedure 400 in which a resource data structure is employed to enable collective firmware updates. In at least some embodiments, the procedure may be implemented by system firmware 202 of a computing device.

A data structure is instantiated that is configured to designate a plurality of resources of a computing device for which updates to firmware are handled collectively through an operating system (block 402). A variety of different techniques may be used to define a designated format and conventions for resource data 128 that maybe consumed by a firmware manager, as discussed above and below. In one approach, a table as described above may be defined with various descriptive fields and corresponding metadata.

Identifiers are generated for each of the plurality of resources that are designated (block 404). Here, the data structure may be defined to include identifiers for each resource that can be used to reference the resources and distinguish between resources. The identifiers may also be used to target firmware updates to appropriate resources. GUIDs or other suitable identifiers may be employed as discussed previously.

The data structure is populated with entries for each of the plurality of resources that include the identifiers (block 406). Here, entries for system firmware and each updatable device are added to the table or other data record. The data structure is exposed to the operating system to enable collective handling of the updates to firmware (block 408). The exposed data structure provides a mechanism for identifying both system firmware and device firmware for updating to the operating system. In at least some embodiments, core system firmware is responsible for allocating and populating the data structure in the designated format. This may occur during a boot sequence for the platform. A different instance of the resource data structure may be instantiated for each boot sequence to reflect current data for the firmware resources. The data structure may be exposed to the operating system 108 and/or firmware manager 126 via UEFI or another suitable interface (e.g., ACPI, BIOS, custom APIs, etc.). The OS/firmware manager may make use of the resource data 128 provided via the data structure to discover resources, configure firmware updates, deploy the updates and otherwise set-up and handle firmware updates for devices enumerated in the data structure. Details regarding techniques for discovery and deployment of firmware updates are discussed in the following section.

Discovery and Distribution

This section describes example techniques for collective management of firmware updates, which may include but is not limited to discovery of updateable resources and distribution of firmware updates to resources that are designated to obtain firmware updates through the firmware update system.

As mentioned, a firmware update system implemented by a firmware manager 126 may be configured to collectively handle firmware updates for a plurality of resources. Resources for a particular computing system or platform may be described in a resource data structure 302 in a designated format that the firmware manager 126 is configured to recognize, such as the examples described in the preceding section. Accordingly, the firmware manager 126 may make use of resource data 128 contained in an appropriate resource data structure 302 to enumerate resources for which handling of firmware updates through the system is designated. Firmware updates for the enumerated resources may be set-up and managed by the firmware manager 126 based on resource data 128 that is conveyed via the resource data structure. Implementation details regarding techniques to collectively manage firmware updates for resources are described in relation to the following example procedure.

Figure 5:
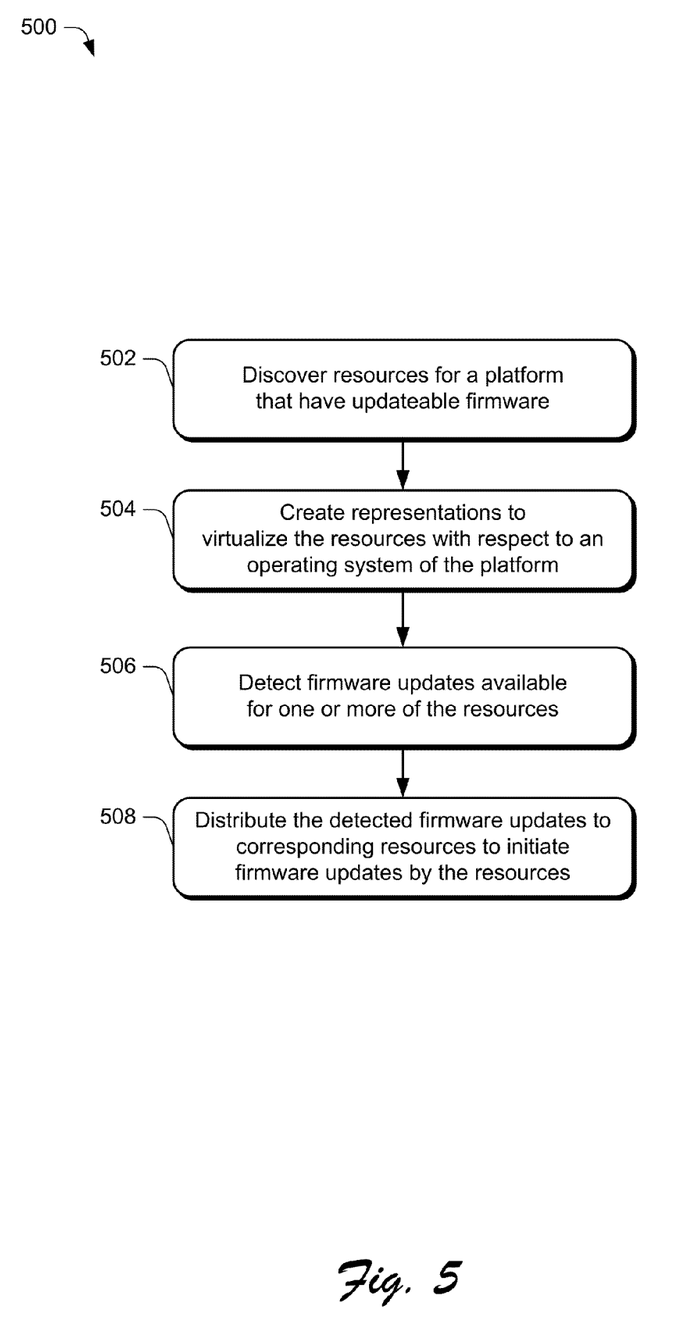
FIG. 5 is a flow diagram that describes details of an example procedure in accordance with one or more embodiments.

In particular, FIG. 5 depicts an example procedure 500 in which firmware updates for multiple resources are handled collectively through a firmware update system. In at least some embodiments, the procedure may be implemented by firmware manager 126 of a computing device 102.

Resources for a platform that have updateable firmware are discovered (block 502). This may occur in any suitable way. For example, the firmware manager 126 may be configured to interact with system firmware 202 to obtain resource data 128 that describes various resources associated with a computing system. The interaction may occur via UEFI, ACPI, BIOS, and so forth. In one approach, the firmware manager 126 discovers resources by referencing a resource data structure 302 in a suitable format as described previously. Each resource may be identified by a corresponding identifier 302 and may be associated with respective descriptions 306 and/or metadata 308. In addition or alternatively, the firmware manager 126 may interrogate the system firmware 202 through prescribed methods and/or functions to find and/or request resource data 128. In another example, system firmware 202 may be configured to supply resource data 128 by broadcasting the data in a defined manner, communicating records/files/message for receipt by the firmware manager, and so forth. Thus, the firmware manager 126 may obtain resource data 128 in various ways and may use the resource data 128 to enumerate resources that have updateable firmware.

Representations are created to virtualize the resources with respect to an operating system of the platform (block 504). Here, the firmware manager 126 may create representations in various formats that are configured to provide software abstractions of the resources within the context of the operating system. The representations may be in the form of objects, records, list items, and/or files that correspond to each resource. Representations may be created for each updateable resource that is enumerated. These virtual representations of the underlying hardware may be employed to set-up and manage firmware updates for the resources and/or to facilitate interaction with the hardware to install the updates. Creating representations for the enumerated resources effectively registers the enumerated resources for handling of firmware updates through the system.

In one example, the firmware update system is configured to produce the representations using built-in operating system functionality for general device management tasks for plug and play devices and/or other devices. For example, the operating system may provide functionality to view hardware devices and control the devices including for example viewing a list of devices and information regarding the devices, enabling/disabling devices, updating device drivers, matching drivers to devices, and so forth. Operating system infrastructure for device management also provide functionality to match driver updates to devices and initiate execution of driver update packages for the devices. Effectively, techniques, infrastructure, and user interfaces provided by the operating system for management of plug and play devices are extended to support collective firmware updates. More generally, detecting and distributing of the firmware updates may be performed through built-in operating system infrastructure that is designed to handle other types of updates, such as driver updates, application updates, and so forth.

To make use of device management infrastructure, for example, each resource having updatable firmware may be represented as a plug and play device. Different resources are assigned identifiers as previously described to reference and distinguish between the resources. The resources may then be discoverable via operating system APIs for device management. The representations may also include information that may be used to filter and categorize entries. The filter/category information enables the OS to selectively retrieve, list, expose, and/or interact with representations for resources having updateable firmware. For example, representations may be associated with resource types (e.g., system firmware/device firmware) and/or an updateable firmware category indication that can be used to distinguish from and filter out other types of representations, such as device driver representations.

Once resources having updatable firmware are represented as plug and play devices, firmware updates for the resources may be acquired, processed, and distributed in manner comparable to updating device drivers. In at least some embodiments, the firmware update packages may be formed in the same format as driver packages that the device management infrastructure recognizes and is able to handle. Here, the format employed for device driver packages does not constrain the underlying payload of the package with respect to what type of payload can be delivered. Accordingly, the device management infrastructure may be leveraged to handle and distribute firmware update packages in addition to other kinds of packages, such as driver update packages. In particular, firmware update packages/payloads are contained in device driver style packages. When update packages are available, the packages may be matched to corresponding representations of the resources. This may occur by comparing identifiers associated with the representations to identifiers contained in the packages to match the updates and resources one to another.

Naturally, the firmware manager 126 may alternatively rely upon other comparable functionality to create virtual representations of the underlying hardware and to handle firmware updates for the resources. For example, rather than relying upon the plug and play infrastructure, infrastructure (e.g., techniques, components, and user interfaces) for representing and handling firmware updates may be integrated into the firmware manager 126. In addition or alternatively, the firmware manager 126 may rely upon other external content management and update delivery systems designed to handle updates for other types of content such as an application update infrastructure or a notification system, to name a few examples. Here, resources may be virtually represented as content items with the content management system and updates for the firmware may be handled through the system along with other types of content. For example, updatable firmware that is enumerated may be represented as installed applications for the application update infrastructure or as delivery endpoints/contacts for the notification system. Further, other formats for firmware update packages/payloads may also employed. Generally, the firmware updates are configured as packages/payloads that correspond to the particular content management system used to handle the updates. For example, the updates may be configured as attachments to notification system messages, as application update packages, as custom packages designed specifically for the firmware update system, and so forth.

Firmware updates available for one or more of the resources are detected (block 506) and the detected firmware updates are distributed to corresponding resources to initiate firmware updates by the resources (block 508). Again a variety of techniques to detect available updates may be employed. For example, the firmware manager 126 may automatically check for updates upon start-up and/or periodically after system boot-up. In addition, firmware manager 126 may check for updates on-demand responsive to an explicit selection to check for updates by user input, an application request, or otherwise. Updates may be accessed and downloaded from a server over a network on an individual basis (e.g., navigation of a browser to obtain selected updates) and/or automatically as part of an overall software update management scheme implemented by the OS. In addition or alternatively, at least some updates may be transferred to a computing device using some form of computer-readable media, such as a compact disk, flash drive, or other media device.

In accordance with the foregoing, the firmware manager 126 may generate and/or reference a list of registered resources using representations for the resources. The list of registered resources may be employed by the firmware manager 126 to check for updates, match updates to resources, distribute updates to appropriate resources and so forth. Version information and status information may also be associated with the representations/list. The version information enables the firmware manager 126 to determine which updates are applicable.

The representations provide a mechanism to target firmware updates to corresponding resources. Updates may be obtained through one or more different distribution mechanisms, some examples of which are discussed above. When updates are available, the firmware manager 126 may match the updates to representations of the resources. Matches may be found based in part upon version information. For example, the firmware manager may recognize the current version of firmware that is installed for a particular resource and determine when a newer version is available. Older versions of the firmware may be ignored and therefore may not produce matches, unless a rollback to a previous version is initiated. The firmware manager may also check to make sure that updates are intended for the particular platform. For example, some updates may be specific to processor architecture or other specific configuration aspects of the platform. Any updates that are not designated for the particular platform may also be ignored.

The firmware manager 126 may stage any matching firmware packages such that the packages are executed during the next boot sequence to cause installation of the updates. This may involve processing the firmware packages, extracting the payloads, and/or copying the payloads for the updates to a designated storage location. In addition, the firmware manager 126 may prepare the system to perform the firmware updates and/or trigger a system restart to initiate installation of the updates. Upon system reboot, the firmware manager may load the payloads into physical memory and create an array of pointers for installation. The array and the payloads may then be passed into system firmware to perform the updates.

Generally speaking, firmware update packages are distributed as payloads that are conveyed by the OS/firmware manager for consumption by the resources and/or system firmware. This may occur by invoking a service implemented by system firmware through a suitable interface. The package may contain an identifier for a corresponding resource, a binary file that encompasses the firmware image for the update, and any additional information to enable the system firmware to handle and execute the package. In a UEFI implementation, for instance, the packages/payload may be passed as UEFI update capsules by invoking an update capsule method specified by UEFI. In addition or alternatively, binary images for firmware updates may be passed in using other suitable interfaces and techniques, such as using ACPI, BIOS or custom interfaces.

Generally, each firmware update package is targeted to a particular firmware resource by including an identifier for the resource in the package. It is possible though for a single firmware update package to target multiple resources in some circumstances. In addition, system firmware updates may encompass multiple individual resources that are updated in combination. It is also possible to designate each updateable resource as part of the system firmware, such that a firmware update for the platform occurs monolithically via a single system firmware update package.

It should be noted that the firmware update system itself is configured to target firmware update packages to resources and hand off the packages to the system firmware to initiate the updates. The firmware update system can do so without having to process or understand the underlying format or code of the payloads that are distributed. Rather, the system firmware and/or a firmware service operate to apply the updates defined by the payloads that are passed in by the update system. Additionally, the firmware update system may have little or no knowledge of the updateable resources outside of the identifiers used to target updates to the resources. From the perspective of the firmware update system, the updateable resources are abstract representations referenced as respective identifiers. Thus, the firmware update system may be unaware of the contents of the payloads it distributes or the details regarding the resources to which the payloads are distributed. Additional details regarding using the described techniques to apply firmware updates to resource across different platforms are discussed in the following section Heterogeneous Firmware Updates In accordance with the foregoing discussion, a resource data structure may be implemented in various was to provide a mechanism that enables IHV/OEMs to advertise/identify system and device firmware resources to the operating system so that the operating system can take over handling of firmware updates for these resources. In addition, an interface between the OS and system firmware may be employed to expose the resource data structure to the OS and provide a mechanism for the OS to distribute firmware update packages to the resources. In at least some embodiments, the firmware update techniques may be implemented through a UEFI system and/or a resource data structure configured as a UEFI system table in the manner described above.

The described mechanisms to discover hardware resources and distribute firmware updates may be employed across heterogeneous platforms that may have different respective computing architectures, hardware, configurations, capabilities, and so forth. This section describes further details regarding using a firmware update system as described herein to handle updates across heterogeneous platforms.

To support different kinds of platforms, the firmware update system may rely upon version information, identifiers, driver versions and other information that is specific to a platform and may differ for different kinds of platforms. This information may be included as metadata 308 associated with a resource data structure 302. During processing of firmware updates, the firmware manager 126 may analyze the metadata 308 to match available updates to corresponding resources. This may include determining the particular type of platform for the updates and making sure that available updates from a vendor/manufacturer are applicable to the platform. In some cases, firmware for the same hardware resource may vary according to the particular platform and therefore the firmware manager 126 ensures that updates are appropriate for the current platform. Checking for updates and matching of updates may occur when the operating system boots and/or periodically at run-time.

In at least some embodiments, identifiers that are associated with resources as described above may be configured as platform specific identifiers. In this approach, the platform specific identifiers may reflect both the identity of the resource and the particular platform. One way this may occur is by assigning different identifiers for hardware resources associated with different platforms, such that each resource/platform combination is assigned a different identifier. The firmware manager 126 may then be able to recognize particular resource/platform combinations based on the different identifiers. In another approach, version information and/or other metadata may be used to identify and distinguish between different platforms. In this way, the firmware manager 126 may determine platforms to which updates are applicable and decide whether or not to apply the updates.

In operation, the OS (through the firmware manager or otherwise) may check whether any available/staged updates apply to the described hardware resources specified in the resource data structure. When applicable updates are detected, the OS initiates the delivery of the firmware updates to system firmware, which executes the updates. This may occur using the UEFI update capsule method or other suitable interfaces/mechanisms as described previously.

The system firmware operates to apply the updates in response to distribution of the update packages. The manner in which the updates are applied depends upon the particular platform and system firmware implementation. By way of example, this may involve one or more of copying files to a persistent storage location, flashing non-volatile memory locations, executing firmware native code, and/or adjusting the system power state. During the update process, the system firmware may be configured to display informational text or images, branded messages, update status/progress indications, and so forth.

During the updates and/or upon completion of updates, feedback regarding installation of the updates including the status of each update, error information, progress indication, and so forth may be supplied by the system firmware back to the operating system. For example, the system firmware may send a status message or a file describing the status for receipt by the operating system. In addition or alternatively, the system firmware may write or modify metadata in the resource data structure that reflects the status of updates and/or any new version information for installed firmware. The status may express success or failure information, as well as details regarding any errors that were encountered. The status information obtained from the system firmware enables the operating system to track success/failure of the updates and versions of installed firmware. This status/version information may be associated with representations used to manage the resources and expose the information to users, such as through plug and play device representations and corresponding user interfaces described previously. The resource data structure may also be modified to reflect newly installed version information for firmware updates that were successful if such information in not already added as part of the installation process. Generally, the resource data structure may be populated with current information/metadata for installed firmware when a new instance of the resource data structure is instantiated during a boot sequence.

The firmware update system is also configured to establish and/or enforce security policies designed to prevent instabilities/failures and to recovery from any unsuccessful installations. The security policies may specify pre-install checks to be performed examples of which include, validating the source and integrity of update payloads, confirming the version of the update, and ensuring that there is sufficient power and storage available to perform the updates. Updates may be aborted if one or more pre-install checks fail. The security policies may also specify post-install checks examples of which include checking the installed firmware image, confirming proper installation, reporting errors, and/or handling any errors encountered.

In the case of failed installs and errors, a mechanism may be implemented to recover from the failure/error. Generally speaking, in response to errors the firmware update system may selectively manage the update process. This may include determining whether to halt operation, retry installation of the update, rollback an update, or continue normal operation based on the feedback. For example, installation may be attempted a configurable number of times before aborting the installation. If a decision is made to abort the installation, the system may automatically rollback the firmware to a last-known good firmware version. This may involve locating and executing an install package corresponding to the last-known good firmware version. Some errors considered relatively minor in nature may be ignored and normal operations may be continued.

As mentioned, for some updates a rollback to a previous version may be prevented. This approach may be employed to prevent rollback past a security update or another critical update. Rollback prevention may occur by specifying a value for the lowest supported firmware version field discussed previously. In another approach, a new identifier for the resource may be generated in response to the update so that updates associated with previous identifiers will no longer be determined by the operating system as applicable matches to the resource.

Figure 6:
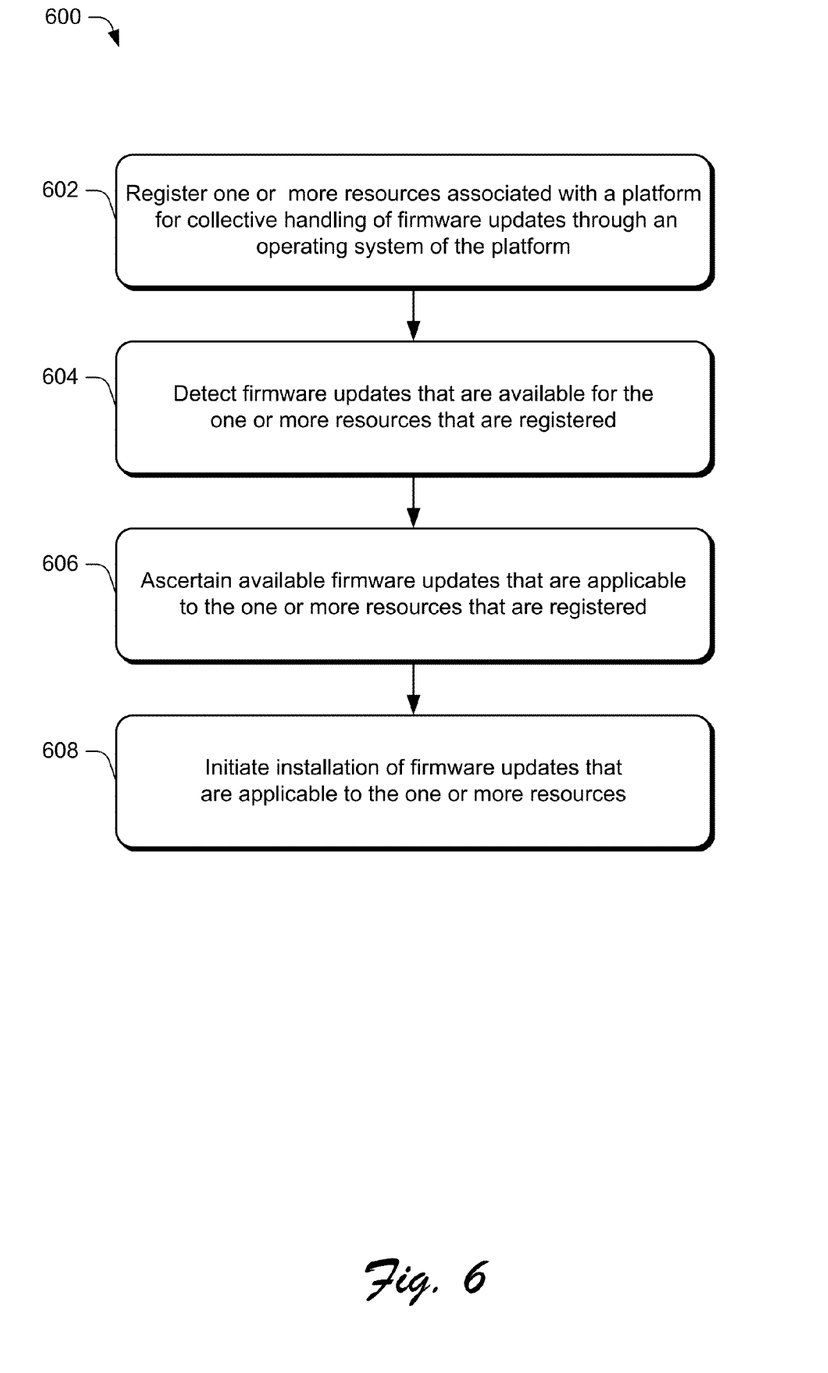
FIG. 6 is a flow diagram that describes details of an example procedure in accordance with one or more embodiments.

Application of firmware updates to heterogeneous systems in accordance with the foregoing description is reflected by the following example procedure. In particular, FIG. 6 depicts an example procedure 600 in which firmware updates corresponding to a platform are detected and applied.

One or more resources associated with a platform are registered for collective handling of firmware updates through an operating system of the platform (block 602). This may occur using a suitable resource data structure as described previously. Firmware updates are detected that are available for one or more resources that are registered (block 604) and available firmware updates that are applicable to the one or more resources that are registered are ascertained (block 606). As mentioned, identifiers associated with update packages may be used to determine applicability of updates and target the updates to matching resources. This may include matching updates to resources on a platform-specific basis based on the identifiers and/or other metadata. This may also involve checking version information for updates against currently installed versions. The current versions of firmware may be reflected in the resource data structure and may be changed as part of the update process when an update is successfully installed.

Installation is initiated for firmware updates that are applicable to the one or more resources (block 608). Here, applicable updates that are determined to match resources are configured for installation. For example, update packages and/or payloads for the updates may be staged in a designated storage location. The staged updates may then be accessed as part of a boot sequence and delivered to system firmware for installation. In this case, updates staged for installation are those determined to be applicable to the particular platform. On another platform, the firmware updated process may be performed in a comparable manner, which in some instances may result in a different set of platform specific update being discovered and distributed.

Having considered example details and techniques regarding a firmware update system, consider a discussion of an example system in accordance with one or more embodiments.

Example System

Figure 7:
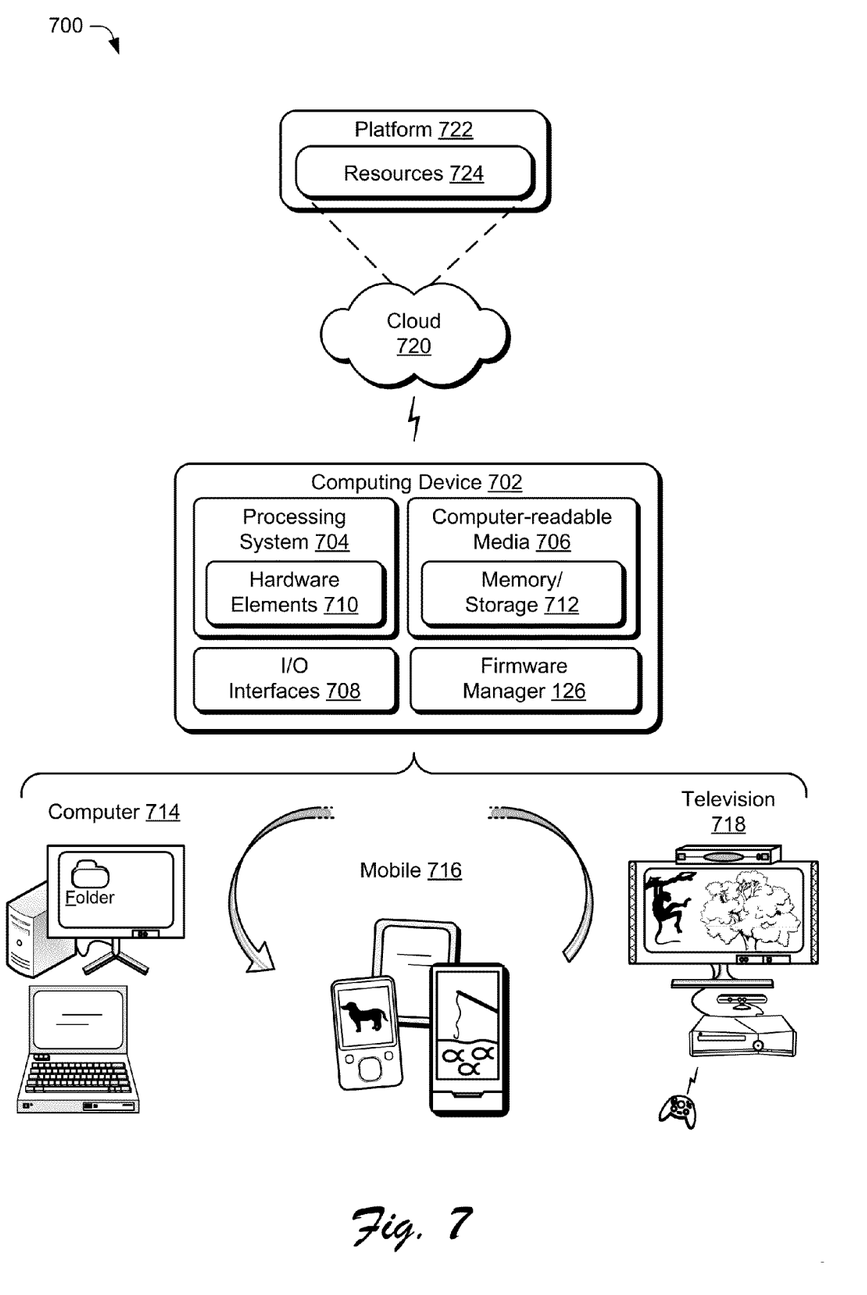
FIG. 7 is a block diagram of a system that can implement the various embodiments.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, firmware manager 126, discovery module 130, update module 132, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the firmware manager 126 on the computing device 702. The functionality represented by the firmware manager 126 and other modules/applications may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
   one or more hardware resources having updateable firmware;
   memory storing a resource data structure configured to identify hardware resources for which updates to associated firmware are designated for handling through a firmware update system of the computing device, the resource data structure including a field configurable to identify a system firmware type and a device firmware type for the identified hardware resources, the field using different identifying type codes for the system firmware type and the device firmware type; and
   a firmware manager module executable by processing hardware of the computing device configured to:
   generate representations of resources identified by the resource data structure as devices within a device management system implemented as built-in functionality of an operating system (OS);
   create list items that are accessible for display and associated with respective representations of the resources; and
   perform device management tasks for the computing device including management of system firmware, device firmware, and device drivers.

2. The computing device as recited in claim 1, wherein the system firmware is further configured to instantiate the resource data structure and populate the resource data structure with entries for selected hardware resources for which updates to associated firmware are designated for handling through the firmware update system.

3. The computing device as recited in claim 2, further comprising an interface between the system firmware and the OS of the computing device operable to expose the resource data structure to the firmware update system through the OS.

4. The computing device as recited in claim 3, further comprising the firmware update system configured to reference the resource data structure to enumerate the selected hardware resources and configure firmware update handling for the selected hardware resources.

5. The computing device as recited in claim 1, wherein the resource data structure is configured to assign different identifiers to the hardware resources used by the firmware update system to reference and target updates to the resources.

6. The computing device as recited in claim 1, wherein the resource data structure is configured to include metadata to indicate version information for installed firmware associated with the hardware resources.

7. The computing device as recited in claim 1, wherein the firmware update system is implemented as a component of the OS of the computing device.

8. The computing device as recited in claim 1, wherein the resource data structure is configured to include:
   an entry for the system firmware, the system firmware being associated with multiple hardware resources for which associated firmware is updated collectively by way of a single firmware package designated for the system firmware; and
   individual entries for each additional hardware resource for which the associated device firmware is updated individually through corresponding device firmware packages.

9. The computing device as recited in claim 1, wherein the system firmware is associated with core hardware of the computing device and the device firmware may be updated independently of the system firmware.

10. The computing device as recited in claim 1, wherein the field is further configured to identify a device driver type.

11. The computing device as recited in claim 1, wherein the collective handling of the updates includes preventing rollback of firmware past a critical update for at least one of the plurality of hardware resources.

12. A method implemented by a computing device comprising:
   instantiating a resource data structure configured to designate a plurality of hardware resources of the computing device for which updates to firmware are handled collectively through an operating system (OS) of the computing device, the resource data structure including a field configurable to identify a system firmware type and a device firmware type for the identified hardware resources, the field using different identifying type codes for the system firmware type and the device firmware type;
   populating the resource data structure with entries for each of the plurality of hardware resources designated for collective handling of updates to firmware through the OS, wherein the hardware resources are represented as devices within a device management system of the OS;

exposing the resource data structure to the OS to enable the OS to collectively handle the updates to system firmware, device firmware, and device drivers through device management functionality provided by the OS; and displaying a graphical user interface (GUI) that includes the device management functionality and displays representations of the hardware resources.

13. The method as recited in claim 12, further comprising generating different identifiers each corresponding to one of the hardware resources that are designated, the identifiers employed by the OS to enumerate the hardware resources and target firmware updates to the hardware resources.

14. The method as recited in claim 13, further comprising obtaining firmware update packages supplied by the OS and targeted to particular hardware resources using the identifiers.

15. The method as recited in claim 12, wherein the collective handling of the updates to includes preventing rollback of firmware past a critical update based at least in part on a field included in the resource data structure indicating a lowest firmware version that is supported.

16. The method as recited in claim 12, wherein the collective handling of the updates to includes preventing rollback of firmware past a critical update based at least in part on generating a new identifier assigned to at least one of the designated hardware resources so that at least one firmware update matched to the at least one of the designated hardware resources prior to the generating the new identifier is not matched to the at least one of the designated hardware resources upon the generating the new identifier.

17. One or more computer-readable storage memories storing instructions that when executed by a computing device cause the computing device to implement a firmware manager to perform acts comprising:

referencing a resource data structure instantiated by system firmware to enumerate hardware resources, the resource data structure configured to include:
  a field configurable to identify a system firmware type and a device firmware type for the enumerated hardware resources, the field using different identifying type codes for the system firmware type and the device firmware type;
  entries indicating hardware resources designated to use a firmware update system of an operating system (OS) to handle firmware updates; and
  viewable list items for the hardware resources to use in the firmware update system; and for hardware resources that are enumerated from the resource data structure, configuring the firmware update system to collectively manage system firmware, device firmware, and device driver updates for the hardware resources including creating representations of the hardware resources as devices within native OS infrastructure employed for device management tasks.

18. One or more computer-readable storage memories of claim 17, wherein the system firmware encompasses multiple individual hardware resources for which associated firmware is updated collectively.

19. One or more computer-readable storage memories of claim 17, wherein the resource data structure includes information regarding each hardware resource having independently updateable firmware that is designated for updates through the firmware update system.

20. One or more computer-readable storage memories of claim 17, wherein the resource data structure includes identifiers for the hardware resources, descriptions of the hardware resources, and metadata used to set-up and implement firmware update handling by the firmware update system for hardware resources as indicated by the resource data structure.

\* \* \* \* \*